United States Patent [19]

Sparling et al.

[11] Patent Number: 4,695,213
[45] Date of Patent: Sep. 22, 1987

[54] CONTROLLED EXPANSION PROTRUDING-HEAD RIVET DESIGN

[75] Inventors: Kenneth P. Sparling, Burbank; Angelo Incardona, Reseada; Garth D. Kikendall, Glendale; David G. Richardson, Burbank; Ronald E. Wood, Sepulveda; Leon Bakow, Sherman Oaks, all of Calif.

[73] Assignee: Lockheed Corporation, Calabasas, Calif.

[21] Appl. No.: 676,464

[22] Filed: Nov. 29, 1984

[51] Int. Cl.⁴ .............................................. F16B 19/06
[52] U.S. Cl. .................................................... 411/506
[58] Field of Search ............... 411/507, 500, 501, 502, 411/503, 504, 505, 506

[56] References Cited

U.S. PATENT DOCUMENTS

| 221,447 | 11/1979 | Cornell . | |
|---|---|---|---|
| 2,233,820 | 3/1941 | Pavlecka | 411/501 X |
| 2,237,338 | 4/1941 | Dale | 85/37 |
| 3,526,032 | 9/1970 | Pipher | 29/509 |
| 3,561,102 | 2/1971 | Diemer | 29/509 |
| 3,821,871 | 7/1974 | Schmitt | 52/758 F |
| 3,927,458 | 12/1975 | Speakmann | 29/407 |
| 4,004,484 | 1/1977 | Speakman | 85/37 |
| 4,051,592 | 10/1977 | Briles | 29/509 |
| 4,230,016 | 10/1980 | Merrell | 85/9 R |
| 4,245,921 | 1/1981 | Falcioni | 403/408 |

FOREIGN PATENT DOCUMENTS 593011  2/1978  U.S.S.R. ............... 411/500

Primary Examiner—Gary L. Smith
Assistant Examiner—Adrian H. Whitcomb, Jr.
Attorney, Agent, or Firm—Louis L. Dachs

[57] ABSTRACT

The rivet 10 comprises a shank portion 12 having a minimum and maximum shank diameter 18. The flush head 14 of the rivet includes a head diameter 23 before forming a land 24 on the edge thereof of between 1.875 times the minimum shank diameter 18 and 1.879 times the maximum shank diameter. The major crown 25 has a height 26 between 0.063 times the minimum shank diameter 18 and 0.078 times the maximum shank diameter and a major crown radius 27 between 2.974 times the minimum shank diameter 18 and 2.690 times the maximum shank diameter. The minor crown radius 30 is between 4.014 times the minimum shank diameter and 2.880 times the maximum shank diameter. The minor crown height 29 of between 0.021 times the minimum shank diameter and 0.031 times the maximum shank diameter. The underhead surface 32 taper angle 34 is between 102 and 103 degrees. The land 24 has a width 37 between 0.021 times the minimum shank diameter 18 and 0.012 times the maximum shank diameter. The minimum head diameter 23' after forming the land 24 is 1.823 times the minimum shank diameter 18. The radius 40 between the shank 12 and flush head 14 is between 0.030 times the minimum shank diameter 18 and 0.080 times the maximum shank diameter. The tail portion 41 also varies as a function of the minimum and maximum shank diameter.

4 Claims, 3 Drawing Figures

CONTROLLED EXPANSION PROTRUDING-HEAD RIVET DESIGN

TECHNICAL FIELD

The invention relates to the field of fasteners and, in particular, to a rivet design which can be used to replace MS20426AD, MS20426D, and MS20426DD Al Alloy rivets.

BACKGROUND INFORMATION

Rivets are probably the oldest and most widely used fastener in industry. They are inexpensive to manufacture, do not require close tolerance holes, and they are easily installed. Riveted structures usually have an extended service (fatigue) life because of the hole-filling characteristics of the rivet. When rivets are driven, the rivet shank expands and tends to fill the hole. This eliminates relative movement between the joined structural members, thus, providing the extended fatigue life.

Pins installed with an interference fit, which puts residual hoop tension stresses around the hole, are used to enhance the fatigue life of structures. These pins are expensive and require very close tolerance holes and, therefore, are expensive to install. One such fastener is the Hi-Tigue pin, manufactured by the Hi-Shear Corporation, Torrance, Calif.

It is more desirable to place residual hoop compression stresses around the hole. One technique to accomplish this, which has been developed by the Fatigue Technology Corporation, Seattle, Wash., is to expand the hole with a removable sleeve and mandrel. The mandrel, while it is being pulled through the hole, stresses the material around the hole beyond the proportional limit in hoop tension. Thus, when the mandrel is removed, the material around the hole recovers elastically and forms local residual hoop compression stresses around the hole.

To obtain better control of the filling of the hole when driving, various rivet designs have been proposed and developed. For example, Russian Pat. No. 516,848 discloses a generally flush-head rivet wherein the countersunk angle in the material being joined is less than the included underside taper of the head. Here, again, this is an attempt to insure that initially all the material in the head is driven into the hole in the structure being joined. Note that in the Russian patent, excess material is provided in the head. While the patent does discuss equal deformation of the holes running through the plates being joined, there appears to be no disclosure of expanding the holes and countersink to improve fatigue life.

The concept of providing excess material in the head of a flush-head rivet is also disclosed in U.S. Pat. No. 3,526,032, "Riveting Method Employing Metal Flow in Both the Manufactured Head and the Upset Head" by F. C. Pipher. Here a spherical surface is provided on the top of the flush-head rivet. The ratio of height of the domed portion of the nominal diameter of the rivet is between 0.039 and 0.048. But this rivet is designed for use in a hole where the countersunk angle is equal to the included angle of the underside of the head of the rivet. This rivet is known to provide improved filling of the hole when compared to commercially available NAS1097 or MS20426 rivets but does not provide significant expansion of the hole and no expansion of the countersink to improve fatigue life.

In none of the above rivets has an attempt been made to make all critical dimensions of the head and tail, before and after driving, of the rivet a function of the shank diameter. Requiring that the critical dimensions be a ratio of the shank diameter makes the design of any rivet with a particular shank diameter easy to accomplish. While in most cases standard rivet sizes will suffice, there are instances where special diameters (inch to metric conversions, etc.) are required. Thus, a rivet having all the critical dimensions based on the shank diameter would minimize design and test time required to insure that the necessary static tension, shear strengths, and fatigue life are achieved.

Applicants' co-pending applications, Ser. No. 657,700, "Controlled Expansion Protruding-Head Rivet Design" and Ser. No. 657,300, "Controlled Expansion Flush-Head Rivet Design" both disclose rivets using the concept of having critical dimensions based on the shank diameter.

Material selection for rivets is also a critical problem. If the material has a low ductility, there will be difficulty in driving the rivet because of the tendency of the bucked tail portion of the rivet to crack and fatigue life will be decreased due to a lack of hole filling. If the material is too malleable, the rivet may not have sufficient strength. So the selection of material properties becomes a trade-off.

One of the ways around this problem has been the use of a 2024-T4 aluminum alloy (icebox) rivet which, when solution heat-treated, quenched, and stored at a temperature below zero degrees Fahrenheit, will remain in a relatively soft condition. Upon return to room temperature, the aluminum alloy rivet must be driven within 15 minutes since it quickly age hardens. Thus, the name "icebox" rivet. While this rivet is widely used, it is expensive to handle. If prematurely brought to room temperature, it cannot be driven without cracking the bucked tail. Rivets inadvertently allowed to harden prior to driving must be reheat-treated. Therefore, from the time of removal from the refrigerator and transport to the assembly station, the rivets are carried and stored in a container filled with dry ice. It is inevitable that some rivets will be driven after they are too hard; thus, they crack and must be drilled out and replaced. The added expense is obvious.

When making "field repairs" in locations where heat treating facilities and dry ice are unavailable, a rivet that can replace the existing large, flush head MS20426DD "icebox" rivet would be desirable. It would also simplify logistics if such a rivet could also replace the MS20426D and MS20426AD "non-icebox" Aluminum Alloy rivets.

Additional patents of interest are as follows: U.S. Pat. No. 221,447, "Rivet" by J. B. Cornell; U.S. Pat. No. 2,237,338, "Rivet" by H. S. Dale; U.S. Pat. No. 3,821,871, "Fatigue Resistant Fasteners" by H. A. Schmitt; U.S. Pat. No. 3,927,458, "Crowned Head Rivet Method" by E. R. Speakman; U.S. Pat. No. 4,004,484, "Crowned Flush Head Rivet" by E. R. Speakman; U.S. Pat. No. 4,051,592, "Expanding Head Riveting Method" by F. S. Briles; U.S. Pat. No. 4,230,016, "Fatigue Resistant Fasteners and Method of Manufacturing Joints Therewith" by H. B. Merrell and U.S. Pat. No. 4,245,921, "Continuously Curved Countersink used with deformable Rivet" by J. G. Falcioni.

Therefore, it is a primary object to provide a rivet that, after driving, obtains controlled expansion of the hole and countersink, placing residual hoop compression stresses in the hole wall, thereby increasing the fatigue life.

It is another object of the subject invention to provide a rivet wherein all critical dimensions of the head and shank before and after driving thereof are ratios of the shank diameter.

It is another object of the subject invention to provide a 7050 aluminum alloy rivet that can be used directly as a substitute for MS20426DD, MS20426D and MS20426AD rivets.

An additional object of the subject invention is to produce a rivet that can be installed and driven in holes produced with standard twist drills and 100° countersinks.

A further object of the subject invention is to provide a rivet that can be installed and driven with or without tank sealant or primer.

DISCLOSURE OF INVENTION

The invention is a flush-head rivet design for joining two or more structural members together. One of the members incorporates a countersink in the hole therethrough having an included angle of between 99 to 101 degrees. The rivet is adapted to be driven by all standard tooling for installing flush-head rivets. This includes hand-bucked, squeezed, or automatic-machine techniques.

In detail, the rivet comprises a shank portion having a minimum and maximum diameter. The head portion of the rivet includes a head diameter before forming the land thereof of between 1.875 times the minimum shank diameter and 1.879 times the maximum shank diameter. The major crown radius is between 2.974 times the minimum shank diameter and 2.690 times the maximum shank diameter with the major crown height being between 0.063 times the minimum shank diameter and 0.078 times the maximum shank diameter. The minor crown radius is between 4.014 times the minimum rivet diameter and 2.880 times the maximum rivet diameter with the minor crown height between 0.021 times the minimum rivet diameter and 0.031 times the maximum rivet diameter. The underhead surface taper angle is between 102 and 103 degrees. The land on the edge is just sufficient to remove the knife edge that would otherwise exist at the intersection of the crown radius and underhead surface, and it has a width between 0.021 times the minimum shank diameter and 0.012 times the maximum shank diameter. The minimum head diameter after forming the land on the edge is 1.823 times the minimum shank diameter.

The radius between the shank and head is between 0.030 times the minimum shank diameter and 0.080 times the maximum shank diameter. The end portion or tail of the shank has a spherical radius which is between 0.365 times the minimum shank diameter and 0.307 times the maximum shank diameter and is tangent to the shank diameter when the radius is perpendicular thereto. The center of curvature of this radius from the tail end of the rivet is between 0.312 times the minimum shank diameter and 0.255 times the maximum shank diameter.

The novel features which are believed to be characteristic to the invention, both as to its organization and method of operation, together with further objects and advantages thereof, will be better understood from the following description connected with the accompanying drawings in which a presently preferred embodiment of the invention is illustrated by way of example.

It is to be expressly understood, however, that the drawings are for purposes of illustration and description only and are not intended as a definition of the limits of the invention.

BRIEF DESCRIPTION OF THE DRAWINGS

Illustrated in FIG. 1 is a side view of the flush-head rivet.

Illustrated in FIG. 2 is a cross-sectional view of the undriven rivet installed in a structure.

Figures 2, 3:
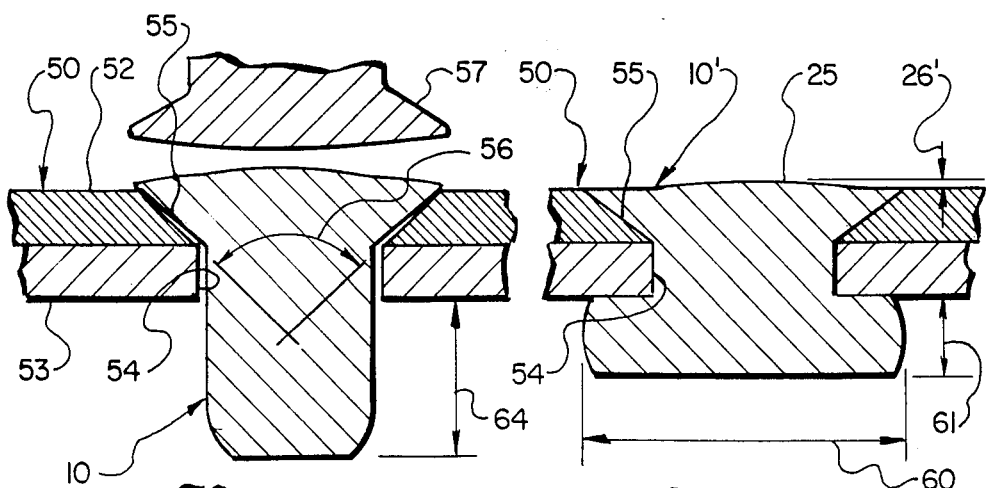

Illustrated in FIG. 3 is a cross-sectional view of the rivet driven in place in the structure shown in FIG. 2.

BEST MODE FOR CARRYING OUT THE INVENTION

Figure 1:
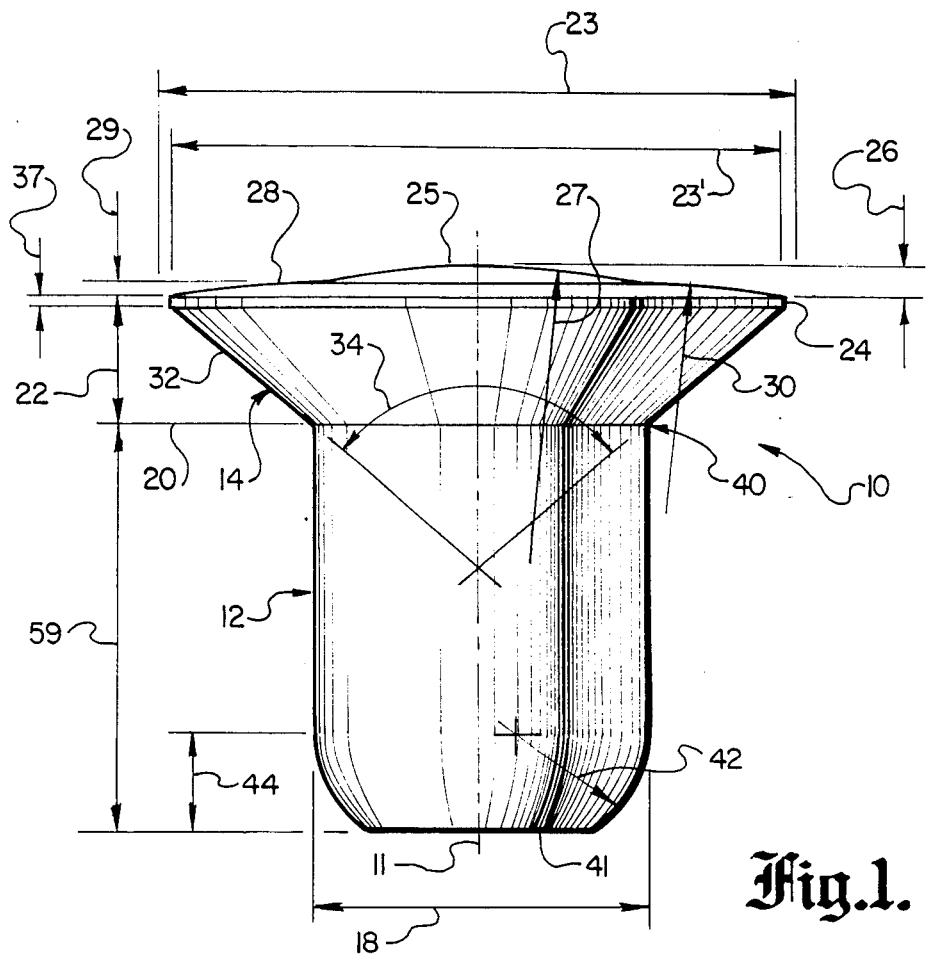

Referring to FIG. 1, it can be seen that the rivet, generally designated by numeral 10, has a longitudinal axis 11 with a shank portion 12 and a flush head 14. The shank portion 12 has a diameter, indicated by numeral 18. The nominal shank diameter is the diameter in the middle of the tolerance range (between the maximum and minimum allowable dimensions). The minimum and maximum diameters of the shank portion are the minimum allowable shank diameter and the maximum allowable shank diameter, respectively (the extremes of the allowable tolerance range of the shank portion).

The plane formed by the intersection of the shank 12 with the flush head 14 is indicated by numeral 20. The height 22 of the flush head 14 is between 0.354 times the minimum shank diameter 18 and 0.350 times the maximum shank diameter. The overall diameter 23 of the flush head 14 prior to forming the land 24 is between 1.875 times the minimum shank diameter 18 and 1.879 times the maximum shank diameter. The major crown 25 has a height 26 that is between 0.063 times the minimum shank diameter 18 and 0.078 times the maximum shank diameter. The radius of curvature of the major crown 25, indicated by numeral 27, is between 2.974 times the minimum shank diameter 18 and 2.690 times the maximum shank diameter. The minor crown 28 has a height 29 between 0.021 times the minimum shank diameter 18 and 0.031 times the maximum shank diameter with the radius of curvature 30 of the minor crown 28 between 4.014 times the minimum rivet diameter and 2.880 times the maximum rivet diameter. The underhead surface 32 of the flush head 14 has an included angle 34 of between 102 and 103 degrees.

To eliminate the sharp outer edge that would otherwise be formed by the intersection of the minor crown 28 and the underhead surface 32, the land 24 is formed on the edge, creating the minimum diameter 23' which is a reference dimension 1.823 times the minimum shank diameter 18, i.e., the outer land has a width 37 of between 0.021 times the minimum shank diameter 18 and 0.012 times the maximum shank diameter. The radius 40 between the shank and head is between 0.030 times the minimum shank diameter 18 and 0.080 times the maximum shank diameter.

The end portion or tail 41 of the shank 12 has a spherical radius 42 which is between 0.365 times the minimum shank diameter 18 and 0.307 times the maximum shank diameter and tangent to the shank diameter when perpendicular thereto. The radius 42 has a center of curvature located from the end or tail of the rivet by dimension 44 which is between 0.312 times the minimum shank diameter 18 and 0.255 times the maximum shank diameter.

Illustrated in FIG. 2 is a structure 50 including plates 52 and 53 having a hole 54 drilled therethrough. The top of the portion of the hole 54 in the plate 52 includes a standard countersink, designated by numeral 55, having an included angle 56 of between 99 and 101 degrees. For purposes of illustration, the countersink included angle 56 is not shown to scale to indicate that there is a difference between it and the included angle 34 of the rivet. The rivet 10 is shown installed in the hole 54 prior to driving. The hole 54 should have a diameter slightly larger than the maximum shank diameter 18. Ideally, this would be a "line-to-line" fit where the maximum shank diameter equals the minimum hole diameter. The maximum hole diameter is 1.05 times the minimum shank diameter 18.

The rivet 10 is driven by conventional driving equipment currently used to drive standard flush-head rivets, such as driver 57 used in conjunction with a bucking bar (not shown). One of the advantages of this rivet design is that these standard driving tools can be used to install the rivet in holes produced by standard twist drills and 100° countersinks.

Illustrated in FIG. 3 is the rivet, installed and driven in the structure 50, designated by numeral 10'. When properly driven, the underhead surface 32 expands and puts residual compressing stress in the countersink 55. The hole 54 is expanded with the hole wall in residual hoop compression stress. This greatly improves the fatigue life of the joined structure 50. The superior static shear strength, tension strength, and fatigue life can be obtained when the grip or thickness of the parts to be joined is less than 2.5 times the shank diameter 18.

Still referring to FIGS. 1–3, the length 59 of the shank 12 must be selected so that the after-driving tail diameter 60 and tail height 61 (FIG. 3) fall between: (1) a tail diameter 60 equal to a minimum of 1.45 times the nominal shank diameter and a tail height 61 equal to a maximum of 0.60 times the nominal shank diameter, and (2) a tail diameter 60 equal to a maximum of 1.75 times the nominal shank diameter and a tail height 61 equal to a minimum of 0.40 times the nominal shank diameter. The above after-driving dimensions can be obtained if the length 59 of the rivet is selected such that the length 64 extending out of the hole 54 prior to driving is 1.1 to 1.3 times the nominal diameter of the shank diameter 18. The after-driving crown height, indicated by numeral 26', is reduced to an almost flat condition (0.004 inch maximum height), which is generally acceptable from an aerodynamic-drag standpoint, and no "finish" machining or "shaving" of the rivet is required.

One of the primary advantages of this flush-head rivet design is that it can be used to directly replace Military Standard icebox rivets, i.e., MS20426DD. One of the best "non-icebox" materials is 7050 aluminum alloy but, even in an optimum heat-treat, it can not be substituted for the icebox rivet using the Military Standard MS20426DD configuration. With this new design, the 7050 alloy performs equal to or better than the Military Standard design. With the following heat-treat schedule, even better performance is obtained: Solution heat-treat at 890°±10° F. for 30 to 60 minutes followed by a cold-water quench at 100° F. maximum. Thereafter, an artificial aging treatment is performed, consisting of 250°±5° F. for 8–10 hours followed by an exposure to 355°±5° F. for 12–14 hours. Increased performance is obtained over the MS20426AD (2017-T4 Al Alloy) and MS20426D (2117-T4 Al Alloy) regardless of heat treatment.

TEST RESULTS

Fatigue tests were run on 3/16 inch diameter rivets both in the subject configuration (No. MR2220FCE6) and Military Standard MS20426DD6 icebox rivets. The load was 10,000 psi. The results of fatigue tests are shown in Table I. These tests demonstrate the subject rivet to be superior to the Military Standard rivet MS20426DD6 in fatigue life.

TABLE I

FATIGUE LIFE

| No of Test Specimens | Rivet Number | Hand or Auto Upset | Test Variable | Geometric Mean Fatigue Life - (Cycles) |
|---|---|---|---|---|
| 4 | MS20426DD6-6 | Hand | Zinc Chromate | $379 \times 10^3$ |
| 2 | MR2220FCE6-6 | Hand | Sealant | $579 \times 10^3$ |
| 4 | MS20426DD6-6 | Hand | Wet Sealant | $170 \times 10^3$ |
| 4 | MR2220FCE6-6 | ↓ | ↓ | $193 \times 10^3$ |
| 2 | MR2220FCE6-6 | ↓ | ↓ | $210 \times 10^3$ |
| 4 | MS20426DD6-6 | ↓ | ↓ | $84 \times 10^3$ |
| 4 | MR2220FCE6-6 | ↓ | ↓ | $137 \times 10^3$ |
| 4 | MS20426DD6-6 | Auto | ↓ | $273 \times 10^3$ |
| 4 | MR2220FCE6-6 | ↓ | ↓ | $477 \times 10^3$ |
| 4 | MR2220FCE6-6 | ↓ | ↓ | $383 \times 10^3$ |

The increased performance of this rivet design, when driven with standard driving tools is believed to be primarily due to the combination of: (1) the countersink hole and rivet underhead controlled angular mismatch, which allows a significant amount of head material to flow into the shank, causing the diameter thereof to significantly expand and put residual hoop compression stresses around the rivet hole, and (2) the significant increase in crown height of the head which provides more material for flow into the shank. Note that the height of the crown is considerably greater than the rivet disclosed in U.S. Pat. No. 3,526,032, "Riveting Method Employing Metal Flow in Both the Manufactured Head and the Upset Head" by F. C. Pipher.

During driving, the material being joined around the hole is subjected to high hoop tension stresses the material into the plastic range and, when the driving forces are removed, leaves residual hoop compression stresses around the countersink and hole next to the rivet. The rivet head and tail is sized so that the volume of rivet material driven into the hole and countersink is sufficient to put the material around the hole into the plastic range. This volume is limited so that, using the standard rivet sets and bucking bars, it is not possible to drive too much rivet material into the hole.

When the proper amount of material has flowed into the shank, the underhead of the rivet head has come into substantially full contact with the countersink and additional driving forces are now primarily directed through the structure being joined into the bucked tail. Thus, controlled expansion of the hole is obtained.

While the flush-head rivet has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

Industrial Applicability

This flush-head rivet is useful for joining structures together and, in particular, aircraft structures.

What is claimed is:

1. A flush-head rivet, having a shank portion with a minimum and maximum diameter and a nominal diameter therebetween, for joining two or more structural members together, the members having a countersunk rivet hole therethrough with a countersink included angle of between 99 and 101 degrees, the rivet providing controlled expansion of the rivet hole when the hole has a minimum diameter equal to the maximum shank diameter and a maximum diameter of 1.05 times the minimum shank diameter, the rivet comprising:

a head portion comprising:

a head diameter before forming a land on the edge thereof of between 1.875 times the minimum shank diameter and 1.879 times the maximum shank diameter;

a minimum head diameter after forming the land on the edge thereof of 1.823 times the minimum shank diameter;

a land width on said head of between 0.021 times the minimum shank diameter and 0.012 times the maximum shank diameter;

a head major crown radius between 2.974 times the minimum shank diameter and 2.690 times the maximum shank diameter; and a major crown height of between 0.063 times the minimum shank diameter and 0.078 times the maximum shank diameter; and a minor crown radius between 4.014 times the minimum shank diameter and 2.880 times the maximum shank diameter;

a minor crown height of between 0.021 times the minor shank diameter and 0.031 times the maximum shank diameter;

an underhead included angle of 102 to 103 degrees.

2. The rivet as set forth in claim 1 wherein the radius between the head and shank is between 0.030 times the minimum shank diameter and 0.080 times the maximum shank diameter and the shank's opposite end or tail has a spherical radius which is between 0.365 times the minimum shank diameter and 0.307 times the maximum shank diameter located by a distance from the shank which is between 0.312 times the minimum shank diameter and 0.255 times the maximum shank diameter and is tangent thereto.

3. A rivet as set forth in claim 2 wherein said rivet is made of 7050 aluminum alloy.

4. A rivet as set forth in claim 3 wherein said rivet is heat-treated to the following schedule:

a solution heat-treat at 890°±10° F. for 30 to 60 minutes;

a cold-water quench at 100° F. maximum; and an artificial age at 250°±5° F. for 8 to 10 hours followed by exposure to 355°±5° F. for 12 to 14 hours.

* * * * *

UNITED STATES PATENT AND TRADEMARK OFFICE
CERTIFICATE OF CORRECTION

PATENT NO. : 4,695,213

DATED : September 22, 1987

INVENTOR(S) : Kenneth P. Sparling et al

It is certified that error appears in the above-identified patent and that said Letters Patent is hereby corrected as shown below:

Title should read

-- Controlled Expansion Flush-Head Rivet and Method of Installing Same --.

Signed and Sealed this

Twenty-ninth Day of March, 1988

Attest:

DONALD J. QUIGG

Attesting Officer      Commissioner of Patents and Trademarks